United States Patent [19]

Rapp

[11] 4,396,722

[45] Aug. 2, 1983

[54] WOOL GLASS COMPOSITION

[75] Inventor: Charles F. Rapp, Newark, Ohio

[73] Assignee: Owens-Corning Fiberglas Corporation, Toledo, Ohio

[21] Appl. No.: 365,705

[22] Filed: Apr. 5, 1982

[51] Int. Cl.³ .............................................. C03C 13/00
[52] U.S. Cl. ...................................... 501/35; 501/38; 501/70
[58] Field of Search ....................... 501/35, 36, 38, 70

[56] References Cited

U.S. PATENT DOCUMENTS

| 2,882,173 | 4/1959 | Welsch | 501/38 |
| 3,013,888 | 12/1961 | de Lajarte | 501/38 |
| 3,234,034 | 2/1966 | Jasinski et al. | 501/31 |
| 3,310,412 | 3/1967 | Hofstadt et al. | 501/35 |
| 4,203,746 | 5/1980 | Battigelli et al. | 501/35 |
| 4,203,774 | 5/1980 | Battigelli et al. | 501/36 |

FOREIGN PATENT DOCUMENTS 9418 4/1980 European Pat. Off. .............. 501/35

*Primary Examiner*—Mark Bell
*Attorney, Agent, or Firm*—Ronald C. Hudgens; Patrick P. Pacella

[57] ABSTRACT

Fiberizable glass compositions are disclosed. The glass compositions are boron-free wool glasses which are useful as insulation. The glass batch used to prepare these glass compositions contains high amounts of iron oxide.

9 Claims, No Drawings

WOOL GLASS COMPOSITION

TECHNICAL FIELD

This invention relates to fiberizable glass compositions. These fibers can be used to make wool glass fibers useful primarily as insulation.

BACKGROUND ART

Fibers have been produced in the past by various methods from glass, slag, fusible rock, and various other materials. Commercial manufacture of fibers from molten glass has been accomplished by subjecting the softened material to high velocity gaseous blasts which attenuate the material to fibers. Steam, compressed air, and hot exhaust gases from a combustion burner have been used as attenuating forces in the known process. Other processes utilize centrifugal or rotary forces for delivering bodies of glass into an annularly shaped gaseous blast which attenuates the glass into fine fibers.

The glass composition to be used with such a process must have particular physical properties which make it possible to use the glass in the process. The rotary process referred to comprises delivering into a rotor or spinner operating at high speed the material which has been heat-softened. The material is then directed outwardly through openings in the periphery of the spinner as individual bodies which are delivered generally radially of the spinner into the annular blast from a burner. The glass compositions of this invention are melted by conventional practices known to the art and require no special treatment during melting or fining.

DISCLOSURE OF INVENTION

I have developed low cost, boron free glasses for wool applications. These boron-free glasses can be formulated with viscosity and liquidus temperatures suitable for fiber formation by the rotary process.

To be fiberized at the most economical commercial production rates by the rotary process, a glass composition ideally should have a viscosity of log n=2.5 at a temperature of about 2250° F. (1232° C.) or less and a liquidus temperature of about 2000° F. (1094° C.) or less.

The unique properties of this glass are obtained with a high amount of iron oxide in combination with the other glass batch ingredients given below. In normal wool glass compositions, the viscosity and liquidus temperatures increase if $B_2O_3$ is removed. In this invention, I found that substantial amounts of iron oxide decrease both the viscosity and liquidus temperatures without adversely affecting chemical durability.

BEST MODE OF CARRYING OUT INVENTION

The glass compositions of this invention are boron-free and consist essentially by weight of:

| Ingredients | Weight Percent |
|---|---|
| $SiO_2$ | 56.0–64.0 |
| $Al_2O_3$ | 3.0–6.0 |
| $Na_2O$ | 16.0–22.0 |
| $K_2O$ | 0.0–2.0 |
| CaO | 3.0–14.0 |
| MgO | 1.0–7.0 |
| $FeO + Fe_2O_3$ | 3.0–10.0 |

More preferably, these boron-free glass compositions consist essentially of, by weight:

| Ingredients | Weight Percent |
|---|---|
| $SiO_2$ | 57.0–64.0 |
| $Al_2O_3$ | 3.0–5.0 |
| $Na_2O$ | 16.0–20.0 |
| $K_2O$ | 0.0–1.5 |
| CaO | 4.0–10.0 |
| MgO | 1.5–6.5 |
| $FeO + Fe_2O_3$ | 3.0–8.0 |

Various other impurities or tramp materials may be present in the glass compositions without adversely affecting the glasses or fibers. These impurities can enter the glass as raw material impurities or can be products formed by the chemical reaction of the molten glass with furnace components. They include up to several percent by weight each of other substituents including $TiO_2$, ZnO, $SO_3$, $Li_2O$, MnO, SrO, BaO and the like. Generally the amount of each substituent ranges up to 3.0 percent, preferably up to 2.0 percent.

Specific boron-free glass compositions embodying the principles of this invention are described in Example I.

EXAMPLE I

| Weight Percent | Control | I | II | III | IV | V | VI | VII |
|---|---|---|---|---|---|---|---|---|
| $SiO_2$ | 63.80 | 61.0 | 61.0 | 61.0 | 61.1 | 59.4 | 59.4 | 59.4 |
| $Al_2O_3$ | 3.83 | 4.5 | 4.4 | 4.4 | 4.4 | 4.4 | 4.4 | 4.4 |
| $Na_2O$ | 15.47 | 19.7 | 17.7 | 19.7 | 21.7 | 17.7 | 19.7 | 21.7 |
| $K_2O$ | 0.75 | 0.3 | 0.3 | 0.3 | 0.3 | 0.3 | 0.3 | 0.3 |
| MgO | 3.67 | 1.6 | 4.5 | 3.7 | 2.9 | 5.1 | 4.3 | 3.5 |
| CaO | 7.78 | 7.6 | 7.2 | 5.9 | 4.7 | 8.1 | 6.9 | 5.7 |
| $B_2O_3$ | 4.45 | — | — | — | — | — | — | — |
| $Fe_2O_3$ | 0.22 | — | | | | | | |
| $FeO + Fe_2O_3$ | — | 4.2 | 4.1 | 4.1 | 4.1 | 4.1 | 4.1 | 4.1 |
| $TiO_2$ | 0.02 | 0.7 | 0.7 | 0.7 | 0.7 | 0.7 | 0.7 | 0.7 |
| MnO | — | 0.1 | 0.1 | 0.1 | 0.1 | 0.1 | 0.1 | 0.1 |
| $P_2O_5$ | — | 0.1 | 0.1 | 0.1 | 0.1 | 0.1 | 0.1 | 0.1 |
| Prepared From | | | | | | | | |
| Basalt | 33.0 | | 32.4 | 32.4 | 32.4 | 32.4 | 32.4 | 32.4 |
| $Na_2CO_3$ | 32.0 | | 28.7 | 32.1 | 35.5 | 28.7 | 32.1 | 35.5 |
| CaO | 4.8 | | | | | | | |
| $CaCO_3$ | | | 7.8 | 5.6 | 3.4 | 9.5 | 7.4 | 5.2 |
| MgO | | | 2.9 | 2.1 | 1.3 | 3.6 | 2.8 | 2.0 |
| $SiO_2$ | 43.5 | | 43.9 | 43.9 | 43.9 | 42.2 | 42.2 | 42.3 |
| T(°F.) for log n = 2.5 | 2176 | 2182 | 2191 | 2181 | 2163 | 2138 | 2125 | 2109 |
| Liquidus T(°F.) | 1720 | 1852 | 1655 | 1665 | 1617 | 1883 | 1694 | 1716 |
| Chemical Durability (% wt. loss in 24 hours) | | | | | | | | |
| $H_2O$ | 1.52 | 1.76 | 2.75 | 4.07 | 4.99 | 1.48 | 3.13 | 3.16 |
| 10% $H_2SO_4$ | 9.65 | 7.56 | 5.77 | 7.78 | 13.50 | 6.61 | 8.20 | 9.28 |

Control 1 is a standard wool glass composition.

The viscosity determinations were obtained using the apparatus and procedure described in U.S. Pat. No. 3,056,283 and in the article in *The Journal of the American Ceramic Society*, Vol. 42, No. 11, November, 1959, pages 537–541. The article is entitled "Improved Apparatus for Rapid Measurement of Viscosity of Glass at High Temperatures" by Ralph L. Tiede.

The glass compositions of this invention have a liquidus temperature of 2000° F. or less, and a viscosity of $10^{2.50}$ poises at about 2250° F. or less. These boron-free glasses are, therefore, suitable for fiber forming. The compositions of this invention achieve these properties with the high amount of iron oxide without adversely affecting chemical durbility.

EXAMPLE II

The glass batch of this invention may be preheated prior to charging to a glass melting furnace.

One method for preheating glass batch involves feeding cold particulate glass batch raw materials into one end of a rotating heat transfer drum, and feeding hot media of larger particle size than the batch particles into the other end of the heat transfer drum. The glass batch moves in direct and immediate physical contact with the heated media, with the batch flowing from the cold end to the hot end of the drum, and the media flowing from the hot end to the cold end of the drum. The heated particulate batch is removed from the hot end of the drum via a batch discharge screen, and the cooled media is removed from the cold end of the drum. Preferably, the heat transfer media is of a durable material and can be comprised of glass batch agglomerates, glass, ceramic material, steel, stainless steel, aluminum, or gravel. The media can be spherical in shape, and a useable example of such media is spherical ceramic balls. The media can be heated with an external burner or preferably heated by direct contact with exhaust gases from a glass melting furnace. The heated batch falls from the discharge screen of the heat transfer drum into the batch charger hopper which directs the batch into a batch charger. The batch charger is a screw conveyor containing a rotatable screw and an outer casing, and is adapted to drive the particulate batch material into the glass melting furnace.

EXAMPLE III

The glass batches of this invention may be agglomerated and preheated prior to charging to a glass melting furnace.

Agglomerating glass batch is produced in an agglomerator which is any conventional piece of equipment available in the art for combining glass forming batch ingredients and water into agglomerates. Typically, the amount of water in the agglomerates will range from 5 to 20 percent by weight. Preferably, the agglomerator will be a conventional rotary disk pelletizer. When manufacturing pellets, it is preferred to pass the pellets through a suitable sizing device such that the pellets to be further processed generally have a maximum dimension in the range of about ¼ to 1 inch and most desirably between ⅜ to about ⅝ inch. The agglomerated glass batch is predryed and then continuously fed countercurrently to the flow of exhaust gas in the preheat hopper. The predrying can take place in a separate dryer with external heating, or in a predryer with spent exhaust gases which have already passed through the bed of agglomerates in the preheat hopper.

In operation, combustion gas is introduced into the lower part of the preheat hopper. Agglomerated glass batch is introduced into the upper part of the preheat hopper. The flow of the gases and agglomerated batch are countercurrent to each other. The dried agglomerates exit through the bottom of the preheat hopper and the cool gases exit through the top of the preheat hopper. A blower or fan may be employed to pull the exhaust gases from the preheat hopper or to maintain a negative pressure in the hopper. The pellets or agglomerates are heated to a temperature ranging from about 900° F. to 1250° F. by this exchange.

The agglomerated batch is continuously fed countercurrently to a flow of hot exhaust gas in the preheat hopper. The preheat hopper is an upright cylindrical chamber with a conical bottom having a pellet inlet and a gas outlet at the top and a pellet outlet and gas inlet at the bottom. The temperature of the gas is about 1200° F. While in the preheat hopper, the pellets and hot exhaust gas are intimately contacted for a time sufficient to heat the agglomerates as described above. The agglomerates then are fed to a glass melting furnace.

INDUSTRIAL APPLICABILITY

The batch ingredients can be melted in a typical gas-fired melting furnace. However, because of the dark color of the glass, heat transfer through the glass is less efficient than clear glasses. Therefore, the use of some electrical heating by submerged electrodes may be desirable. The melt is then formed into multiple streams of glass which are attenuated into individual fibers by the rotary process.

Various treatments may be applied to the fibers as they are produced. For example, the use of aqueous dispersions comprising phenolic resoles as binders in the production of wool and board products from glass and other vitreous fibers is common practice. The phenolic resoles also can be modified to improve resistance to heat, including flame, by reaction with dicyandiamide. Similar use of melamine, urea and thiourea to modify phenolic resoles also are known.

Specifically, a binder composition which contains a phenolic resole, urea and amino alkyl silanes can be employed. The specific identity of the phenolic resole in a composition according to the invention is not critical. Accordingly, the resole can be a partial condensation product of any suitable phenol with any suitable aldehyde (for a discussion of resoles, see Martin, The Chemistry of Phenolic Resins, John Wiley & Sons, Inc., New York, 1956, particularly pages 87 through 98, and cited references).

A method of making a glass fiber product comprises forming glass fibers from molten streams of glass and combining the glass fibers with a heat curable aqueous binder composition having a water dilutability of at least 1000 percent. The binder composition comprises the combination of: (1) 60–95 percent by weight of a polymeric component comprising (a) 70–80 percent by weight of a phenol formaldehyde partial condensation component, (b) 5–15 percent by weight of a dicyandiamide formaldehyde partial condensation component, (c) 5–30 percent by weight of a urea formaldehyde partial condensation component, (d) mixtures of (a), (b) and (c), and (e) 5–40 percent by weight of an unreacted nitrogenous compound; (2) 0.5–25.0 percent by weight of a lubricant, based on the total weight of a lubricant, based on the total weight of the partial condensation and unreacted nitrogenous compound; (3) 0.1–1.0 percent by weight of a silane, based on the total weight of the partial condensation components and unreacted nitrogenous compound; (4) 0.2–3.0 percent by weight of an ammonium salt of a strong acid based on the total weight of the partial condensation components and unreacted nitrogenous compound; (5) water, to dilute the binder to a desired solids of from 1–40 percent. The combination of glass fibers and heat curable binder is consolidated into a loosely packed mass on a foraminous conveyor. The mass may be optionally compressed to increase the density thereof and subsequently heated to cure the binder on the glass fibers to form the desired product.

The above glass compositions are adapted for use in the rotary process where the spinner is preferably operated at a relatively low temperature to reduce the erosion and oxidation of the spinner during use. Low operating temperatures are made possible by the glass compositions disclosed with the result that the spinner and other glass handling apparatus have a greater useful life.

I claim:

1. Boron-free glass fibers consisting essentially of, by weight:

| Ingredients | Weight Percent |
| --- | --- |
| $SiO_2$ | 56.0–64.0 |
| $Al_2O_3$ | 3.0–6.0 |
| $Na_2O$ | 16.0–22.0 |
| $K_2O$ | 0.0–2.0 |
| CaO | 3.0–14.0 |
| MgO | 1.0–7.0 |
| $FeO + Fe_2O_3$ | 4.1–10.0 | and up to several percent of each of other substituents including $TiO_2$, ZnO, $SO_3$, $Li_2O$, MnO, SrO and BaO having a viscosity of log n=2.5 at a temperature of about 1232° C. or less and a liquidus temperature of about 1094° C. or less.

2. Boron-free glass fibers consisting essentially of, by weight:

| Ingredients | Weight Percent |
| --- | --- |
| $SiO_2$ | 57.0–64.0 |
| $Al_2O_3$ | 3.0–5.0 |
| $Na_2O$ | 16.0–20.0 |
| $K_2O$ | 0.0–1.5 |
| CaO | 4.0–10.0 |
| MgO | 1.5–6.5 |
| $FeO + Fe_2O_3$ | 4.1–8.0 | and up to several percent each of other substituents including $TiO_2$, ZnO, $SO_3$, $Li_2O$, MnO, SrO and BaO having a viscosity of log n=2.5 at a temperature of about 1232° C. or less and a liquidus temperature of about 1094° C. or less.

3. Boron-free glass fibers consisting of, by weight:

| Ingredients | Weight Percent |
| --- | --- |
| $SiO_2$ | 61.0 |
| $Al_2O_3$ | 4.5 |
| $Na_2O$ | 19.7 |
| $K_2O$ | 0.3 |
| CaO | 7.6 |
| MgO | 1.6 |
| $FeO + Fe_2O_3$ | 4.2 |

4. Boron-free glass fibers consisting essentially of, by weight:

| Ingredients | Weight Percent |
| --- | --- |
| $SiO_2$ | 61.1 |
| $Al_2O_3$ | 4.4 |
| $Na_2O$ | 17.7 |
| $K_2O$ | 0.3 |
| CaO | 7.2 |
| MgO | 4.5 |
| $FeO + Fe_2O_3$ | 4.1 |

5. Boron-free glass fibers consisting essentially of, by weight:

| Ingredients | Weight Percent |
| --- | --- |
| $SiO_2$ | 61.0 |
| $Al_2O_3$ | 4.4 |
| $Na_2O$ | 19.7 |
| $K_2O$ | 0.3 |
| CaO | 5.9 |
| MgO | 3.7 |
| $FeO + Fe_2O_3$ | 4.1 |

6. Boron-free glass fibers consisting essentially of, by weight:

| Ingredients | Weight Percent |
| --- | --- |
| $SiO_2$ | 61.1 |
| $Al_2O_3$ | 4.4 |
| $Na_2O$ | 21.7 |
| $K_2O$ | 0.3 |
| CaO | 4.7 |
| MgO | 2.9 |
| $FeO + Fe_2O_3$ | 4.1 |

7. Boron-free glass fibers consisting essentially of, by weight:

| Ingredients | Weight Percent |
| --- | --- |
| $SiO_2$ | 59.4 |
| $Al_2O_3$ | 4.4 |
| $Na_2O$ | 17.7 |
| $K_2O$ | 0.3 |
| CaO | 8.1 |
| MgO | 5.1 |
| $FeO + Fe_2O_3$ | 4.1 |

8. Boron-free glass fibers consisting essentially of, by weight:

| Ingredients | Weight Percent |
| --- | --- |
| $SiO_2$ | 59.4 |
| $Al_2O_3$ | 4.4 |
| $Na_2O$ | 19.7 |
| $K_2O$ | 0.3 |
| CaO | 6.9 |
| MgO | 4.3 |
| $FeO + Fe_2O_3$ | 4.1 |

9. Boron-free glass fibers consisting essentially of, by weight:

| Ingredients | Weight Percent |
| --- | --- |
| $SiO_2$ | 59.4 |
| $Al_2O_3$ | 4.4 |
| $Na_2O$ | 21.7 |
| $K_2O$ | 0.3 |
| CaO | 5.7 |
| MgO | 3.5 |
| $FeO + Fe_2O_3$ | 4.1 |

* * * * *